(12) United States Patent
Yuen et al.

(10) Patent No.: US 10,496,499 B2
(45) Date of Patent: Dec. 3, 2019

(54) SYSTEM AND METHOD FOR DATACENTER RECOVERY

(71) Applicant: ROYAL BANK OF CANADA, Montreal (CA)

(72) Inventors: Elton Yuen, Toronto (CA); Jacqueline Kirkland, Toronto (CA); Michael Stoyke, Toronto (CA)

(73) Assignee: ROYAL BANK OF CANADA, Montreal, QC (CA)

( * ) Notice: Subject to any disclaimer, the term of this patent is extended or adjusted under 35 U.S.C. 154(b) by 196 days.

(21) Appl. No.: 15/697,377

(22) Filed: Sep. 6, 2017

(65) Prior Publication Data

US 2019/0073276 A1 Mar. 7, 2019

(51) Int. Cl.
*G06F 11/00* (2006.01)
*G06F 11/14* (2006.01)
*G06F 11/20* (2006.01)
*G06F 11/10* (2006.01)
*H04L 29/08* (2006.01)

(52) U.S. Cl.
CPC ...... *G06F 11/1469* (2013.01); *G06F 11/1092* (2013.01); *G06F 11/1402* (2013.01); *G06F 11/1417* (2013.01); *G06F 11/1448* (2013.01); *G06F 11/2064* (2013.01); *H04L 67/34* (2013.01); *H04L 67/1097* (2013.01)

(58) Field of Classification Search
CPC ............ G06F 11/1469; G06F 11/1417; G06F 11/1448; G06F 11/1092; G06F 11/0793; G06F 11/1402
See application file for complete search history.

(56) References Cited

U.S. PATENT DOCUMENTS

| | | | |
|---|---|---|---|
| 7,178,059 B2 * | 2/2007 | Greenspan | H04L 29/06 714/10 |
| 2011/0099359 A1 * | 4/2011 | O'Neil | G06F 9/4406 713/2 |
| 2011/0246813 A1 * | 10/2011 | Collier | G06F 11/2035 714/3 |
| 2017/0185488 A1 * | 6/2017 | Kumarasamy | G06F 11/1451 |

* cited by examiner

*Primary Examiner* — Charles Ehne
(74) *Attorney, Agent, or Firm* — Norton Rose Fulbright Canada LLP

(57) ABSTRACT

An improved approach for disaster recovery is provided, along with corresponding systems, methods, and computer readable media. In the improved approach, a set of applications are assigned one or more application weightings (e.g., based upon asset type, a recovery time objective, a recovery time capability, a criticality to key business functions, vendor hosting, interfaces with other systems), etc. The one or more application weightings are utilized for ranking the applications, and the ranked set of applications is utilized to generate a disaster recovery boot sequence whereby specific recovery tasks and infrastructure device requirements are arranged temporally to achieve one or more recovery time conditions.

20 Claims, 9 Drawing Sheets

| App Code | Application Name | Asset Type | FST_ASSET_TYPE | Most Aggressive RTO | RTO Weighting | Recovery Time Capability | 10 % RT Capability | SOX Critical | SOC 1 | SOX_SOC1_Correction | Successor | Weighted Average of H M L Both or Outgoing Interfaces | Total Weight |
|---|---|---|---|---|---|---|---|---|---|---|---|---|---|
| WCM0 | Application 1 | APP | 500000 | Immediate/Dynamic | 0 | 4 Hours | 1000 | No | Yes | (250000) | TDD0 | 35 | 250,965 |
| YQO0 | Application 2 | APP | 500000 | 1 Hour | 2,500 | 4 Hours | 1000 | Yes | Yes | (250000) | YWH0 | 171 | 253,329 |
| YWQ0 | Application 3 | APP | 500000 | 1 Hour | 2,500 | 12 Hours | 2500 | Yes | Yes | (250000) | YWH0 | 29 | 254,971 |
| SXV0 | Application 4 | APP | 500000 | 1 Hour | 2,500 | 12 Hours | 2500 | Yes | Yes | (250000) | VZZ0 | 23 | 254,977 |
| YET0 | Application 5 | APP | 500000 | 4 Hours | 10,000 | 2 Hours | 500 | No | Yes | (250000) | XCK0 | 10 | 260,490 |
| YEM0 | Application 6 | APP | 500000 | 1 Hour | 2,500 | 1 Hour | 250 | No | No | 0 | 3H00 | 41 | 502,709 |
| SYC0 | Application 7 | APP | 500000 | 4 Hours | 10,000 | 3 Hours | 750 | No | No | 0 | UGB0 | 47 | 510,703 |
| YC20 | Application 8 | APP | 500000 | 4 Hours | 10,000 | 3 Hours | 750 | No | No | 0 | SYC0 | 13 | 510,737 |
| XCK0 | Application 9 | APP | 500000 | 4 Hours | 10,000 | 12 Hours | 2500 | No | No | 0 | | 0 | 512,500 |
| YKS0 | Application 10 | APP | 500000 | 4 Hours | 10,000 | 24 Hours | 2750 | No | No | 0 | SXS0 | 77 | 512,673 |
| UNV0 | Application 11 | APP | 500000 | 5 Hours | 12,500 | 5 Hours | 1250 | No | No | 0 | | 0 | 513,750 |
| WBK0 | Application 12 | APP | 500000 | 12 Hours | 25,000 | 12 Hours | 2500 | No | No | 0 | UUK0 | 61 | 527,439 |
| VX0 | Application 13 | APP | 500000 | 24 Hours | 27,500 | 24 Hours | 2750 | No | No | 0 | XPU0 | 38 | 530,212 |

FIG. 4

| Calculated Recovery Time Capability | Plan ID | Total Strategy Time | Longest Requirements Time | DR Plan - Elapsed Timing | Requirement ID | Device Name | Platform Category | Inferred Application Ranking | CI Ranking | Number of Support Staff | CI RTC | Aggregated CI RTC |
|---|---|---|---|---|---|---|---|---|---|---|---|---|
| 335 | Plan-988193 | 330 | 0 | 330 | 1012068 | Device 1 | Physical-General | 300 | 1 | 1 | 0 | 0 |
| 335 | Plan-988193 | 330 | 0 | 330 | 1012068 | Device 2 | Physical-General | 300 | 2 | 1 | 0 | 0 |
| 335 | Plan-988193 | 330 | 0 | 330 | 1012068 | Device 3 | Physical-General | 300 | 3 | 1 | 0 | 0 |
| 335 | Plan-988193 | 330 | 0 | 330 | 1012068 | Device 4 | Physical-General | 300 | 4 | 1 | 0 | 0 |
| 335 | Plan-988193 | 330 | 0 | 330 | 1012068 | Device 5 | Physical-General | 300 | 5 | 1 | 0 | 0 |
| 335 | Plan-988193 | 330 | 0 | 330 | 1012068 | Device 6 | Physical-General | 300 | 6 | 1 | 0 | 0 |
| 335 | Plan-988193 | 330 | 0 | 330 | 1012068 | Device 7 | Physical-General | 300 | 7 | 1 | 0 | 0 |
| 335 | Plan-988193 | 330 | 0 | 330 | 1012068 | Device 8 | Physical-General | 300 | 8 | 1 | 0 | 0 |
| 335 | Plan-988433 | 105 | 120 | 225 | 1012177 | Device 9 | Physical-General | 371 | 9 | 1 | 0 | 0 |
| 335 | Plan-988292 | 180 | 0 | 180 | 1012110 | Device 10 | Physical-General | 1024 | 10 | 1 | 0 | 0 |
| 335 | Plan-988062 | 90 | 0 | 90 | 1012019 | Device 11 | Physical-General | 1074 | 11 | 1 | 0 | 0 |
| 335 | Plan-988062 | 90 | 0 | 90 | 1012019 | Device 12 | Physical-General | 1074 | 12 | 1 | 0 | 0 |
| 335 | Plan-988062 | 90 | 0 | 90 | 1012019 | Device 13 | Physical-General | 1074 | 13 | 1 | 0 | 0 |
| 335 | Plan-988189 | 95 | 120 | 215 | 1012067 | Device 14 | Physical-General | 1193 | 14 | 1 | 0 | 0 |
| 335 | Plan-988189 | 95 | 120 | 215 | 1012067 | Device 15 | Physical-General | 1193 | 15 | 1 | 0 | 0 |
| 335 | Plan-988126 | 0 | 240 | 240 | 1012044 | Device 16 | Physical-General | 1433 | 16 | 1 | 0 | 0 |
| 335 | Plan-988126 | 0 | 240 | 240 | 1012044 | Device 17 | Physical-General | 1433 | 17 | 1 | 0 | 0 |
| 335 | Plan-988374 | 225 | 60 | 285 | 1012144 | Device 18 | Virtual-General | 1029 | 1 | 1 | 60 | 60 |
| 335 | Plan-988357 | 215 | 120 | 335 | 1012138 | Device 19 | Virtual-Unix-AIX | 600 | 1 | 4 | 120 | 120 |
| 335 | Plan-988357 | 215 | 120 | 335 | 1012138 | Device 20 | Virtual-Unix-AIX | 600 | 2 | 4 | 120 | 120 |

FIG. 5

| Task ID | Total Strategy Time | Application Ranking | Strategy ID | Strategy Type | Task Order Number | Task Type | Recovery Task Short Description |
|---|---|---|---|---|---|---|---|
| RT-1382501 | 330 | 300 | RS-01709 | Pre - Exercise Activities | 1 | Exercise only | Create a change record (CR) to the Organization CM Database Admin |
| RT-1382502 | 330 | 300 | RS-01709 | Pre - Exercise Activities | 2 | Exercise only | Create a change record (CR) to the Organization NAS Admin team |
| RT-1382504 | 330 | 300 | RS-01709 | Pre - Exercise Activities | 3 | Exercise only | Bring up Application in DR mode |
| RT-1382505 | 330 | 300 | RS-01709 | Pre - Exercise Activities | 4 | Exercise only | Follow the steps to bring up Rates infinity Adapters in DR mode |
| RT-1382516 | 330 | 300 | RS-01710 | Recovery Steps | 1 | DR only | Bring the DR Database Server up and running. |
| RT-1382517 | 330 | 300 | RS-01710 | Recovery Steps | 2 | DR only | Break mirror on NAS volumes to the Application DR server |
| RT-1382518 | 330 | 300 | RS-01710 | Recovery Steps | 3 | DR and Exercise | Bring up Application in DR mode |
| RT-1382519 | 330 | 300 | RS-01710 | Recovery Steps | 4 | DR and Exercise | Bring up Rates infinity Adapters in DR mode |
| RT-1382521 | 330 | 300 | RS-01710 | Recovery Steps | 5 | DR only | Update AppConfig from Application |
| RT-1382522 | 330 | 300 | RS-01710 | Recovery Steps | 6 | DR and Exercise | Start the Official Cube on the DR server |
| RT-1382523 | 330 | 300 | RS-01710 | Recovery Steps | 1 | Exercise only | Bring the DR Database Server up and running |
| RT-1382524 | 330 | 300 | RS-01710 | Recovery Steps | 2 | Exercise only | Break mirror on NAS volumes for DR server. |
| RT-1382531 | 330 | 300 | RS-01711 | Service Validation | 1 | DR and Exercise | Open Cache Browser |
| RT-1382532 | 330 | 300 | RS-01711 | Service Validation | 2 | DR only | Using Application viewer, load a Application valuation job previous business day |
| RT-1382533 | 330 | 300 | RS-01711 | Service Validation | 2 | Exercise only | Using Application viewer, load a Application valuation job from previous business day |
| RT-1382534 | 330 | 300 | RS-01711 | Service Validation | 3 | Exercise only | Run a valuation job for previous business day |
| RT-1382535 | 330 | 300 | RS-01711 | Service Validation | 4 | Exercise only | Open an instance of Application Trader and ensure it's up |
| RT-1382537 | 330 | 300 | RS-01712 | Post - Exercise Activities | 1 | Exercise only | Bring the PROD Database Server up and running |
| RT-1382538 | 330 | 300 | RS-01712 | Post - Exercise Activities | 2 | Exercise only | Shutdown Application in DR and start in PROD |
| RT-1382539 | 330 | 300 | RS-01712 | Post - Exercise Activities | 3 | Exercise only | Revert Data Loader and Cube to PROD server |
| RT-1382541 | 330 | 300 | RS-01712 | Post - Exercise Activities | 4 | Exercise only | Bring up Rates infinity Adapters in DR mode |
| RT-1382542 | 330 | 300 | RS-01712 | Post - Exercise Activities | 5 | Exercise only | Put mirror back on NAS |

FIG. 6

| Task ID | Total Strategy Time | Application Ranking | Strategy ID | Strategy Type | Task Order Number | Task Type | Recovery Task Short Description |
|---|---|---|---|---|---|---|---|
| RT-1379271 | 165 | 338 | RS-02549 | Pre - Exercise Activities | 1 | Exercise only | Submit Change ticket 14 days prior to test |
| RT-1379274 | 165 | 338 | RS-02549 | Pre - Exercise Activities | 2 | Exercise only | Bring the DR Database Server online |
| RT-1379276 | 165 | 338 | RS-02549 | Pre - Exercise Activities | 3 | Exercise only | Bring the DR MQ Server online |
| RT-1379278 | 165 | 338 | RS-02549 | Pre - Exercise Activities | 4 | Exercise only | Bring the DR NAS server online |
| RT-1379280 | 165 | 338 | RS-02549 | Pre - Exercise Activities | 5 | Exercise only | Verify required end-user workstation changes with business |
| RT-1379283 | 165 | 338 | RS-02549 | Pre - Exercise Activities | 6 | Exercise only | Bring DR Citrix server online |
| RT-1379285 | 165 | 338 | RS-02550 | Recovery Steps | 1 | DR only | Verify access and status of recovery servers |
| RT-1379287 | 165 | 338 | RS-02550 | Recovery Steps | 2 | DR only | Handover to Business for verification |
| RT-1379288 | 165 | 338 | RS-02550 | Recovery Steps | 3 | DR only | Verify required end-user workstation changes with business |
| RT-1379289 | 165 | 338 | RS-02550 | Recovery Steps | 1 | Exercise only | Apps stop |
| RT-1379290 | 165 | 338 | RS-02551 | Service Validation | 1 | DR only | Verify access and status of recovery servers |
| RT-1379295 | 165 | 338 | RS-02551 | Service Validation | 1 | Exercise only | Verify access and status of recovery servers |
| RT-1379298 | 165 | 338 | RS-02551 | Service Validation | 2 | Exercise only | Handover to Business for verification |
| RT-1379301 | 165 | 338 | RS-02551 | Service Validation | 3 | Exercise only | Verify required end-user workstation changes with business |
| RT-1379303 | 165 | 338 | RS-02552 | Post - Exercise Activities | 1 | Exercise only | Verify access and status of recovery servers |
| RT-1379304 | 165 | 338 | RS-02552 | Post - Exercise Activities | 2 | Exercise only | Handover to Business for verification |
| RT-1379305 | 165 | 338 | RS-02552 | Post - Exercise Activities | 3 | Exercise only | Verify required end-user workstation changes with business |

FIG. 7

SYSTEM AND METHOD FOR DATACENTER RECOVERY

FIELD

The present disclosure generally relates to the field of computing system disaster recovery, and more specifically, to improved disaster recovery for by prioritizing critical applications to improve associated recovery times of a subset of computing systems.

INTRODUCTION

Disaster recovery is a time sensitive operation as an operator seeks typically to minimize downtime of critical computer systems to reduce operational impacts. A number of computing systems may need to be restarted, and in some situations, there may be computing systems that are damaged or rendered inoperable (e.g., in the event of a flood, a fire, a power surge). For large datacenters including a large number of devices running a large number of applications, there may be a significant delay before all applications can be recovered and are operational.

SUMMARY

An improved approach for disaster recovery is provided, along with corresponding systems, methods, and computer readable media. In the improved approach, a set of applications are assigned one or more application weightings (e.g., based upon asset type, a recovery time objective, a recovery time capability, a criticality to key business functions, vendor hosting, interfaces with other systems), etc. The one or more application weightings are utilized for ranking the applications, and the ranked set of applications is utilized to generate a disaster recovery boot sequence whereby specific recovery tasks and infrastructure device requirements are arranged temporally to achieve one or more recovery time conditions. The disaster recovery boot sequence may be stored in a data structure and may include control signals, which when activated, cause the disaster recovery boot sequence to be implemented by way of propagation and dissemination to infrastructure devices. The control signals may include physical operation parameters (e.g., power on, operate at a particular processing speed, activate cooling system), and software/virtual operation parameters (e.g., initiate virtual machine, start software application, start web server, start relational database), among others. In some further embodiments, a feedback mechanism is provided whereby estimated recovery time capabilities are measured against actual recovery time required during either disaster recovery operations or simulations thereof.

In an aspect, there is provided a computer implemented system for generating a data center recovery boot sequence, the system comprising: an application prioritization processor configured to monitor an application inventory record, the application inventory record identifying a plurality of applications operating at a data center, and for each of the plurality of applications, the application prioritization processor is configured to identify data center resources utilized by the application and to generate a priority metric for each of the plurality of applications; a recovery task provisioning engine configured to map each of the plurality of applications to a task list identifying recovery tasks for recovering the resources utilized by the respective applications; and a boot sequence generation processor configured to generate a recovery boot sequence including a sequence of the recovery tasks for recovering the resources utilized by the plurality of applications, the recovery boot sequence determined based on the priority metric such that a first application of the plurality of applications is recovered before a second application of the plurality of applications when the first application has a higher priority that than the second application.

In another aspect, upon detection by the application prioritization processor of a new application not previously identified by the application inventory record, the application prioritization processor is further configured to identify data center resources utilized by the first application, map the new application to a task list identifying recovery tasks for recovering the resources utilized by the new application; generate a priority metric for the new application; and generate a new recovery boot sequence including the recovery tasks for the new application.

In another aspect, the task list identifies recovery duration records for each of the recovery tasks; and the system comprises: an infrastructure device monitoring engine configured to track execution of a particular recovery task to determine a recovery duration for the particular recovery task, and update the recovery duration record for the particular recovery task; and the boot sequence generation processor is configured to regenerate the recovery boot sequence based on the updated recovery duration.

In another aspect, the system includes an infrastructure device monitoring engine configured to monitor a data center resource inventory record, the data center resource inventory record identifying a plurality of resources at the data center and one or more of the plurality of applications utilized by the plurality of resources; and upon detection of a new resource identified by the data center resource inventory record, the recovery task provisioning engine is configured to map the plurality of applications to new task lists including recovery tasks for the new resource; and the boot sequence generation processor is configured to generate a new recovery boot sequence including the recovery tasks for the new resource.

In aspect, there is provided a method for generating a data center recovery boot sequence, the method including monitoring an application inventory record, the application inventory record identifying a plurality of applications operating at a data center; for each of the plurality of applications, identifying data center resources utilized by the application. In some examples, utilized includes: consumed resources, reserved/allocation resources, among others, and resources may include: devices (e.g., servers), memories, ports, connections, network devices, operating systems, low level services (e.g., kernel services, drivers), among others.

The method includes mapping each of the plurality of applications to a task list identifying recovery tasks for recovering the resources utilized by the respective applications, wherein recovering may include rebooting, restarting, reinitializing, generally bringing the resource into a state to enable the operation of the application, among others, and generating a priority metric for each of the plurality of applications, generating a recovery boot sequence including a sequence of the recovery tasks for recovering the resources utilized by the plurality of applications, the sequence determined based on the priority metric such that a first application of the plurality of applications is recovered before a second application of the plurality of applications when the first application has a higher priority that than the second application.

In another aspect, the method includes upon detection of a recovery trigger, generating signals to initiate execution of the recovery boot sequence, where, for example, a recovery trigger may include detecting failure of one or more resources, failure of a threshold number of resources, failure of one or more critical resources, and generating signals may include generating instructions to execute boot sequence (sending boot signals to resources, running scripts), outputting listing of boot sequence to local display/mobile device/printer, generating message/alerts, among others.

In another aspect, the method includes for each of the plurality of applications, determining a recovery time for the application based on an estimated completion time of the recovery tasks of the application in the recovery boot sequence.

In another aspect, the method includes upon detection of a new application not previously identified by the application inventory record, identifying data center resources utilized by the first application; mapping the new application to a task list identifying recovery tasks for recovering the resources utilized by the new application; generating a priority metric for the new application; and generating a new recovery boot sequence including the recovery tasks for the new application.

In another aspect, the method includes for each of the plurality of applications, determining a recovery time for the application based on the estimated completion time of the recovery tasks of the application in the new recovery boot sequence.

In another aspect, the method includes, upon the estimated recovery time for a particular application of the plurality of applications exceeding a defined recovery threshold for the particular application, generating an alert.

In another aspect, the task list identifies recovery duration records for each of the recovery tasks; the method including: monitoring execution of a particular recovery task to determine a recovery duration for the particular recovery task; updating the recovery duration record for the particular recovery task; and regenerating the recovery boot sequence based on the updated recovery duration.

In another aspect, recovery tasks may need to be shared by multiple applications, or recovery tasks are flagged as not being required (e.g., did not fail).

In another aspect, the method includes registering a new resource or application for disaster recovery.

In another aspect, applications and their associated recovery tasks and/or infrastructure resources are identified by conducting a query to identify recovery tasks and/or infrastructure resources having a particular encoded application code or hosting code.

In another aspect, the method includes a periodic regeneration or refresh of associated recovery tasks and/or infrastructure resources by scanning for application codes, thereby providing a dynamic monitoring system that continuously identifies which aspects for future recovery operations (e.g., reboot).

In another aspect, a generated boot sequence is configured to recover device based on highest priority amongst applications associated with the device.

In another aspect, the method includes balancing one or more competing application start-up priorities to minimize recovery time in relation to a minimum operational level (e.g., online banking could be run on a single machine, so prioritize the recovery of a single machine first and then add additional machines to bring online banking up to full capacity, while balancing other application priorities).

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 4 is an example table indicating a ranked set of applications and their associated weightings, according to some embodiments.

FIG. 5 is an example table indicating a ranked set of devices and their associated rankings, according to some embodiments.

FIG. 6 is an example table indicating a ranked set of recovery tasks and their associated task orders for a particular application, according to some embodiments.

FIG. 7 is an example table indicating a ranked set of recovery tasks and their associated task orders for another application, according to some embodiments.

DETAILED DESCRIPTION

Figure 1:
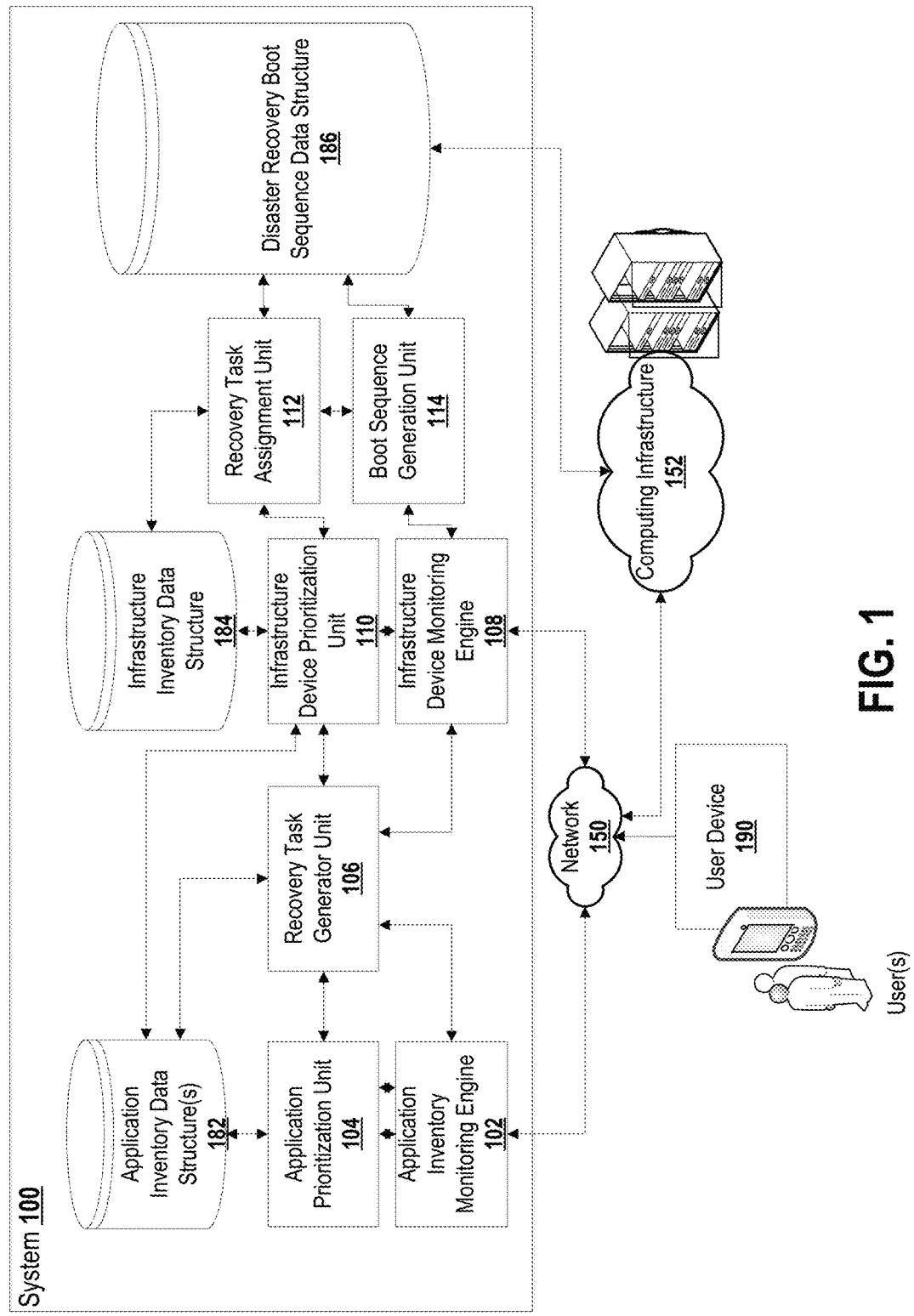
FIG. 1 is a view of an example of a block schematic diagram of a system for disaster recovery of computing infrastructure, according to some embodiments.

Disaster recovery may function in a naïve manner, whereby various systems and resources are restarted and allocated various recovery tasks. However, conducting disaster recovery in a naïve manner may lead to various critical systems being held offline longer than required.

Further, in relation to operating procedures, regulatory reasons, or technical audits, there may be an increased emphasis or requirement for certain critical applications to become available and operational within a particular recovery time objective (e.g., maximum downtime for a critical backend service is sixty minutes). Accordingly, it may be important that recovery time objectives are not breached in recovering from a disaster.

Embodiments relate to a system and method for data center recovery. In an aspect, embodiments relate to a system and method for data center recovery of related devices, applications, and tasks based on criticality in terms of data loss and time loss.

There may be regulatory, or technical audit reasons stipulating a recovery time requirement for various computing infrastructure components, and ultimately their supported applications (e.g., IT Governance Control Frameworks, Sarbanes Oxley compliance, among others, service agreements, regulations/statutes). However, the management, tracking, and implementation of disaster recovery is a non-trivial and technically challenging endeavor, as it can be difficult to predict with certainty the amount of time required to recover functionality. Further, in a modern computing environment, computing resources, including infrastructure resources are often shared between applications, hosted by third party vendors, or housed in geographically disparate data centers. The assignment of infrastructure resources to applications can vary over time or processing load, and it is challenging to determine with precision which resources need to be recovered, and in what order, to recover computing operations following a disaster or other type of event. The tracking, monitoring, and management of limited time resources in the event of a disaster is critical in reducing downtime.

Computing resources and applications, in operation, are typically in a state of flux whereby resources are assigned to applications based on business needs, load demands (actual or predicted), and it is preferable that a disaster recovery system is configured for dynamically or periodically tracking the assignment of applications to resources.

Disaster recovery requires a number of recovery tasks to be completed, for example, the physical start-up of a server, the initiation of a service, or the provisioning of a virtual machine. There may be different disaster recovery needs relative to various applications, and recovery tasks need to be scheduled and/or otherwise arranged temporally as time and recovery resources are finite (e.g., communication bus bandwidth for transmitting recovery instructions/boot sequences). The sequencing of recovery tasks is important as computing devices and infrastructure may need to prioritize which tasks to run first (e.g., which virtual machine to initialize first), among others.

There may be a minimum recovery requirement required for disaster recovery relative to full operational status. For example, where normally a pool of twenty servers are utilized for online banking application(s), online banking application(s) may be considered functionally operational (albeit with performance reduction) with three servers. In some embodiments, a recovery time objective is based on the restoration of functional operation (as opposed to full operation).

In some instances, disaster recovery was conducted using a manual system, whereby recovery tasks are conducted on an ad-hoc and uncoordinated manner. An improved disaster recovery mechanism is proposed, whereby a data-centric system that monitors and queries data center operational metrics to (1) generate more granular recovery time capability for critical applications and for a data center as a whole, and/or to (2) generate one or more notifications or alarms where recovery time capability exceeds or otherwise is not compliant with disaster recovery requirements.

The mechanism may be provided in the form of a computer implemented tool that can be utilized to generate, for a given scope of applications and/or definition of functional operation (e.g., a minimum number of computing infrastructure required to support an application being able to run at an acceptable, albeit not optimal, level of performance), an estimate for a recovery time capability. For example, the tool can be utilized to invoke the disaster recovery mechanism to indicate that an enterprise or other data center will require 24 days to recover, and a more granular analysis can then be conducted to identify the reasons why the data center requires 24 days to require. A systems administrator may be able to then identify root causes of the time required for disaster recovery, and propose/implement remedial steps to reduce the time required.

The tool provides an improved monitoring and visibility tool that can be utilized for orchestration of disaster recovery operations or automated compliance auditing with disaster recovery metrics, based on the determined and/or periodically maintained and updated estimated recovery times, for one or more optimized and generated boot sequences.

The computer-implemented approach for application/computing infrastructure resource weighting and ranking, and control of recovery task provisioning incorporates interdependencies between components in the data center, providing oversight into whether a particular application is able to become operational within a desired or required recovery time.

The state of a data center often changes as new applications are required, additional load is required to be handled, computing infrastructure components are cycled, and a technical challenge is to maintain an accurately prioritized boot sequence. Accordingly, in some embodiments, responsive to a detected change to the data center infrastructure components or applications, a new boot sequence is regenerated and estimated recovery time capabilities are re-determined. Where estimated recovery time capabilities exceed requirements, an alarm or other notification may be generated.

In some embodiments, a dynamic data feed of regulatory or other technical requirements is provided and processed, modifying the application requirements and ultimately the rankings and prioritization of the applications, the computing infrastructure resources, and recovery tasks as required recovery times are modified. Responsive to changes in the required recovery times, a prioritized boot sequence may be re-generated. Where estimated recovery time capabilities exceed requirements, an alarm or other notification may be generated.

In accordance with various embodiments, one or more computer implemented tools are provided that generate and/or implement disaster recovery protocols, stored on one or more data structures. For example, the data structures may store and/or update boot sequences that are used in the event of disaster recovery (e.g., scheduled, balanced and prioritized automated recovery tasks) that are initiated when a disaster event occurs. In alternate embodiments, the system actively controls infrastructure resources and transmits a series of control signals in accordance with the disaster recovery data structure to begin and track a process of disaster recovery.

In yet another alternate embodiment, the system is configured to periodically simulate disaster recovery operations to assess a difference between expected recovery time and actual recovery time capability. The difference may be input into the system in a feedback loop optimized to reduce the difference (e.g., as an error term). Where there is a plurality of different variations on order of recovery tasks for disaster recovery, the system may be configured to utilize machine learning or artificial intelligence approaches to determine heuristically which variations yield improved actual or estimated recovery time capabilities, weighted towards key and/or critical applications.

FIG. 1 is a view of an example of a block schematic diagram of a system for disaster recovery of computing infrastructure, according to some embodiments. Computing units are implemented by way of processors and/or physical circuitry.

A system 100 is configured for generating a data center recovery boot sequence. In some embodiments, system 100 is a tool implemented using a plurality of processors, memory, and storage devices that is adapted for maintaining data structures encapsulating data center recovery boot sequences as series of computing control commands. In other embodiments, system 100 is a computing platform that controls provisioning of data center resources, orchestrating recovery activities through coordinated signalling and monitoring (e.g., propagating one or more control signals that are timed or otherwise impart a specific sequence of disaster recovery device booting/initialization). System 100 may communicate with computing infrastructure 152 via a network 150 which may include the Internet, an intranet, a message bus (e.g., IBM Websphere MQ™), among others. System 100 may receive data feeds indicative of characteristics (e.g., time required to turn on, load capacity, temperature) of data resources of the computing infrastructure 152, which, for example, may include physical and virtual assets of a data center or a cluster of data centers (e.g., hard drives, routers, servers, test environments, virtual machines, memory, cache sizes, whether the assets need to start in a "cold" state, are already started in a "warm"/"hot" state). The computing resources of the data center or a cluster of data centers operate to service various applications, and applications may be serviced across shared computing resources in a 1:n configuration a n:n configuration a n:1 configuration, among others. Accordingly, there may not be an exact 1:1 mapping between computing resources as computing resources are not necessarily utilized in a dedicated manner.

Similarly, in some embodiments, there may be dynamically assignable resources, which can be adapted to flexibly service any application (e.g., servers that are simply reimaged to service another application). For these dynamically assignable resources, recovery tasks associated may include modifying the resources to service a particular application (e.g., convert a server into a production server for hosting the website by remotely controlling the loading of the website production server image).

A disaster recovery tool may be provided that is configurable by a system administrator using user device 190, whereby disaster recovery times, objectives, and capabilities are managed and displayed on a suitably configured graphical user interface. Where estimated disaster recovery times are in breach of one or more pre-defined constraints or requirements, the system administrator may be alerted by way of a notification (e.g., auditory) or graphical alert (e.g., notification on a mobile device) indicating that remedial action is required as the desired recovery time objective is unlikely to be met (e.g., an estimated recovery of 5 hours is greater than an acceptable downtime of 4.5 hours).

The remedial action may include making more/faster computing resources available (e.g., transitioning the application from a shared, slow server to a fast, dedicated server) changing the criticality and/or priorities associated with the applications (e.g., reassessing which applications are critical), re-establishing definitions of functional operability of applications (e.g., having a single production server out of fifty production servers for the webpage recovered may be sufficient to simply have the webpage operational, despite severe but acceptable performance issues), modifying application/infrastructure dependencies, among others.

System 100 may be implemented using computing hardware, and in some embodiments, is a standalone special purpose computing device (e.g., computing appliance for connection to one or more data centers or one or more computing resources), whereby the special purpose computing device is implemented using a combination of optimized limited purpose circuitry (e.g., application-specific integrated circuits). System 100 includes application inventory monitoring engine 102 configured for maintaining and/or monitoring an application inventory record stored on a data structure, the application inventory record identifying a plurality of applications operating at a data center.

For each application, the inventory record identifies data center resources utilized by the application. Data center resources include consumed resources, reserved/allocation resources, among others, and resources may include devices (e.g. servers), memories, ports, connections, network devices, operating systems, low level services, etc., among others.

The application inventory monitoring engine 102 is configured to monitor a data center resource inventory record (e.g., by way of a data feed), the data center resource inventory record identifying a plurality of resources at the data center and one or more of the plurality of applications utilized by the plurality of resources. Descriptions obtained in the data feed may include descriptions of applications, including application identifier encodings, inventory codes mapped to specific computing resources, and the monitoring may be conducted by way of a daemon, an automated script, an agent and/or any other application/service, that is configured to periodically or continuously obtain information (e.g., polling, requesting).

Upon detection of a new resource identified by the data center resource inventory record, the application inventory monitoring engine 102 is configured to map the plurality of applications to new task lists including recovery tasks for the new resource; and request the generation of a new recovery boot sequence including the recovery tasks for the new resource. For each application record, the resource utilization records may be parsed to identify one or more applications utilizing the computing resource (e.g., where there is shared hosting); and data records may be updated to associate the computing resource and the applications utilizing the resources in a data center resource inventory record.

The system 100 may be configured to conduct various scans to assess what applications are running on what computing resources, or to assess what computing resources are supporting which applications. In some embodiments, application inventory monitoring engine 102 is configured for conducting scans of a data center to identify what computing resources are in the data center or controlled by the data center, and their supported applications. Each application or each task associated with the application may be assigned one or more resource identifiers, each resource identifier identifying a specific resource or class of resources on which the application or task is to be executed (e.g., Sun Solaris™, AIX™, OS/2™, Microsoft Windows™ platforms).

The application inventory monitoring engine 102 is configured to receive a data feed including encapsulated instructions for identified required recovery times assigned to particular applications. The data feed is processed and parsed and individual instructions are identified and assigned to specific applications in the application inventory data structure(s) 182, the instructions indicative of required recovery times. For example, the data feed may be provided in the form of a set of recovery time objectives indicative of maximum possible recovery time objectives for specific applications. Where the system 100 cannot recover the applications to meet the recovery time objectives, an alert or notification may be produced. In some embodiments, recovery time objectives may be set at 0 (e.g., immediate/dynamic) for critical applications where downtime is unacceptable. To meet a recovery time objective of 0, "hot" (e.g., mirrored, fully operational resources) may be switched over for operation.

Applications are prioritized based on various metrics, including, for example, but not limited to, asset types, importance to regulatory/financial compliance requirements, criticality to operations, dependencies, among others. An application score is aggregated to generate a holistic weighting of each application relative to one another by application prioritization unit 104. The application score may represent a type of generated priority metric for each of the plurality of applications. The application score and the application inventory may be maintained and/or otherwise stored on application inventory data structure(s) 182.

The application prioritization unit 104 is configured such that when two applications utilize the same resource, a task for recovering said same resource is assigned the higher of the priority metrics of the two applications. For example, if a server is hosting a website (high priority) and internal training (low priority), the recovery of the server is assigned the higher of the priority metrics. The priority metric can be generated based on, for example, an application type, an application criticality parameter, an application output criticality parameter or a number of application interfaces.

An application criticality parameter could include recovery time objective, how important the application/service is (e.g., online banking). Application output criticality may indicate how important the output is, e.g., Sarbanes-Oxley compliance, etc. The number of application interfaces may be a useful proxy indicative of how interconnected an application/device may be with other systems, and thus raising the priority of the application/device as it has a higher likelihood of interdependence with others.

For each application a set of recovery tasks are determined and/or identified by recovery task generator unit 106. The infrastructure device monitoring engine 108 is configured to periodically or continuously monitor computing resources to assess their status and availability.

The infrastructure device monitoring engine 108 may receive a data feed indicative of current mappings of computing resources to applications, and these mappings, for example, may be in the form of operational encodings (e.g., an application operational code) or hosted encodings (e.g., a hosting operational code), where computing resources are shared as between different applications (e.g., a router or a single server may serve multiple applications). The infrastructure device monitoring engine 108 is configured to track both physical and virtual assets. For example, infrastructure device monitoring engine 108 is configured to track physical equipment, such as routers, processors, storage devices, magnetic tape backups, etc., and virtual assets, such as virtual machines (e.g., as managed by a hypervisor), etc.

The infrastructure device monitoring engine 108 includes data structures tracking, in the form of data records, information associated with the computing resources, including time required for start-up/shut down, whether disaster recovery resources need to be provisioned from a basic starting point (e.g., a "cold" disaster recovery resource), or disaster recovery resources are provided in a state of semi-readiness (e.g., a "warm" disaster recovery resource), or a state of full readiness (e.g., a "hot" disaster recovery resource), among others.

Recovery tasks for each infrastructure/computing resource are identified and/or determined by the recovery task generator unit 106. The infrastructure device prioritization unit 110 is configured to receive the prioritized application from application inventory data structure 182, and generate a prioritized list of disaster recovery tasks whereby applications are brought online and operational based at least on the generated application priority ranking values.

The recovery task assignment unit 112 is configured to map each of the plurality of applications to a task list identifying recovery tasks for recovering the resources utilized by the respective applications. Recovery tasks, for example, may include rebooting, restarting, reinitializing, and other tasks directed to bringing the resource into a state to enable the operation of the application.

The recovery tasks may be provided in the form of a task list that identifies recovery duration records for each of the recovery tasks, the recovery duration being determined by monitoring execution of a particular recovery task to determine a recovery duration for the particular recovery task and updating the recovery duration record for the particular recovery task.

The prioritized set of recovery tasks is output to a boot sequence generation unit 114 that is configured to maintain a disaster recovery boot sequence data structure 186 including control signals and timings required for recovering the one or more applications.

In some embodiments, a boot sequence may be generated based on an updated recovery duration as changes are detected over time. The recovery boot sequence includes a sequence of the recovery tasks for recovering the resources utilized by the plurality of applications, the sequence determined based on the priority metric such that a first application of the plurality of applications is recovered before a second application of the plurality of applications when the first application has a higher priority that than the second application.

In some embodiments, when a subset of the recovery tasks in the task list for recovering the resources utilized by a particular application of the plurality of applications is identified as a minimal task list, a recovery boot sequence is generated such that the minimal task list has a higher priority metric in the sequence than other recovery tasks for the particular application. For example, the minimal task list may indicate a "critical path" set of features for restoring at least basic, acceptable levels of functionality, and the minimal task list, generated as a subset of all recovery tasks, may aid in reducing overall time required for disaster recovery to a minimally functional level of operation.

In some embodiments, an application in the application inventory list can be split in two or more parts. For example, an application inventory list can include an entry for Application A minimal functionality, as well as an entry for Application A additional functionality. Even though they technically relate to Application A, each entry can be treated as a separate application with separate priority weighting parameters and separate task lists.

A recovery trigger may be utilized to initiate execution of the recovery boot sequence, whereby the disaster recovery boot sequence data structure 186 is accessed to generate control signals that are orchestrated across a set of computing infrastructure resources 152, controlling resources to undertake disaster recovery operations. Recovery operations are monitored and information is stored in disaster recovery boot sequence data structure 186 to track actual performance against estimated performance. Recovery triggers, for example, may include detecting failure of one or more resources, failure of a threshold number of resources, failure of one or more critical resources, among others. The recovery activities may include generating instructions to execute boot sequence (sending boot signals to resources, running scripts), outputting listing of boot sequence to local display/mobile device/printer, generating message/alerts, among others.

In some embodiments, disaster recovery boot sequence data structure 186 is periodically updated to establish, for each of the plurality of applications, a recovery time for the application based on an estimated completion time of the recovery tasks of the application in the recovery boot sequence. This recovery time may be useful for ensuring compliance with one or more audit/technical disaster recovery requirements, among others.

Application inventory monitoring engine 102 is configured to periodically or continuously process a data feed from network 150 indicative of presently operational applications. In some embodiments, upon detection of a new application not previously identified by the application inventory record, identifying data center resources utilized by the first application, the application inventory monitoring engine 102 is configured for mapping the new application to a task list identifying recovery tasks for recovering the resources utilized by the new application. The application prioritization unit 104 then generates a priority metric for the new application; a new recovery boot sequence is generated including the recovery tasks for the new application. Accordingly, for each of the plurality of applications, there may then be a need for determining a new recovery time for each application given the new recovery boot sequence.

Figure 2:
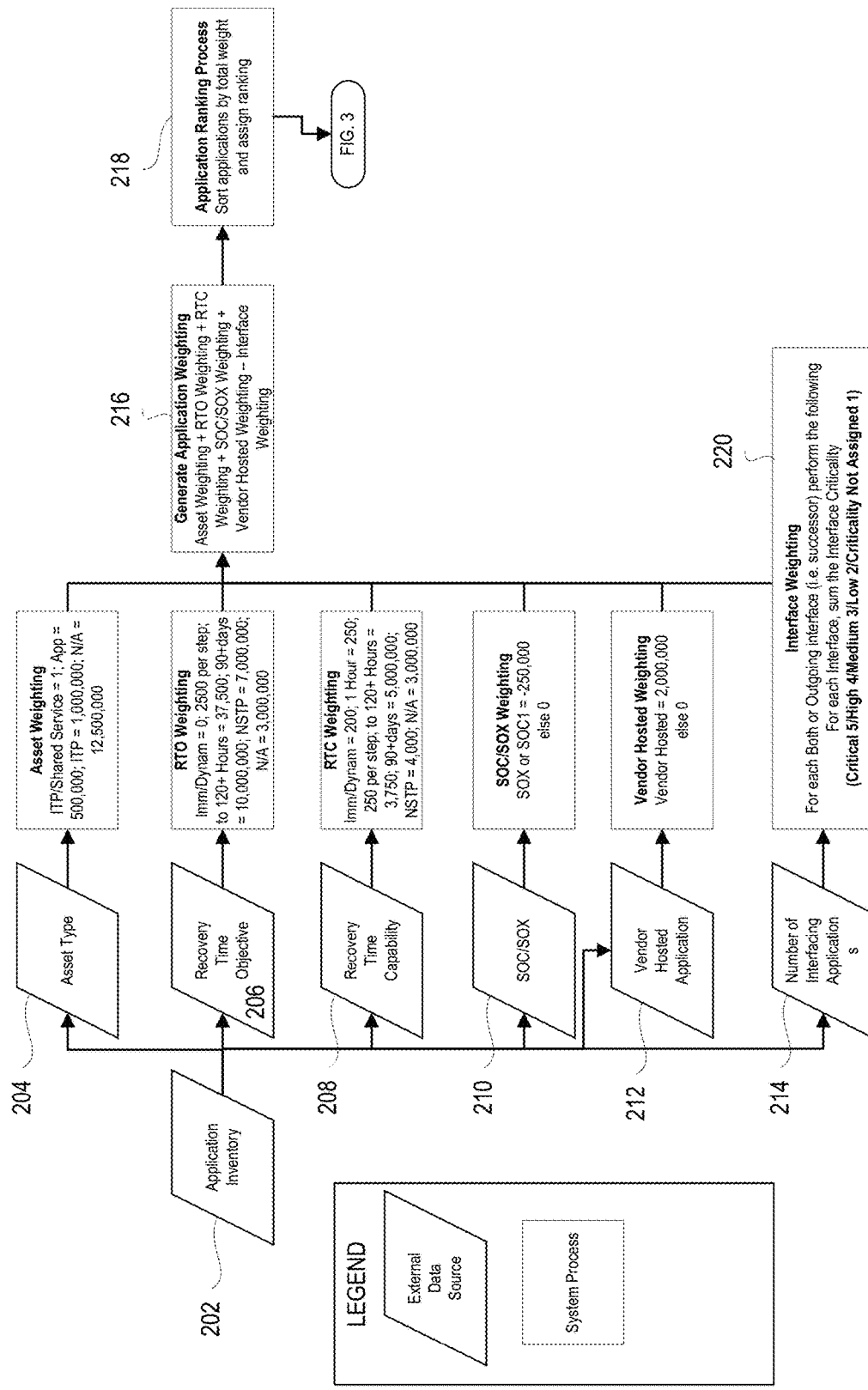
FIG. 2 is a process diagram of an example method for disaster recovery, according to some embodiments.

FIG. 2 is a process diagram of an example method for disaster recovery, according to some embodiments.

An application inventory 202, stored in a data structure, may be provided that tracks one or more applications (e.g., online banking, internal training, active directory, financial reporting, order/trade management, internal communications platforms). In some embodiments, the application inventory 202 is periodically queried from one or more external systems that are configured to provide an up to date list of applications currently being in use by an organization, along with a desired criticality rating, a recovery time objective (hard or soft) computing infrastructure requirements and/or expected load information. The list of applications may be stored in the application inventory 202 as a series of encoded values, each corresponding to a unique application of the plurality of applications (e.g., application codes).

The application inventory 202 may, for each application, store a series of data records. Application inventory 202 may include various types of values, such as asset type data value 204, a recovery time objective data value 206, a recovery time capability data value 208, a service organization control (e.g., as required by Sarbanes-Oxley audits) data flag 210, a vendor hosted application data flag 212, and identified interfacing applications data value 214.

FIG. 4 is an example table indicating a ranked set of applications and their associated weightings, according to some embodiments. In FIG. 4, a list of example applications is shown along with a generated weighting. The overall application weighting 216 is generated based on a combination of the data records stored on application inventory 202, and assigned to each application.

The application weighting is generated based on an ordered combination of the asset weighting 202, the recovery time objective 206, the recovery time capability 208, whether there are regulatory/technical audit flags in operation 210, whether there are vendor hosted application audit flags 212 in operation, and based on identified interdependencies (e.g., as estimated for example, by the number of interfacing applications) 214 (where step 220 can be applied to add additional weighting based on specific characteristics of the interface (e.g., For each incoming/outgoing or outgoing interface (i.e., successor), the system sums the an interface criticality score).

The application weighting is used to apply an application ranking process 218, which then updates the application inventory 202 such that the data structure reflects an updated hierarchy of applications, ranked by the weighted application ranks as identified in 216.

Figure 3:
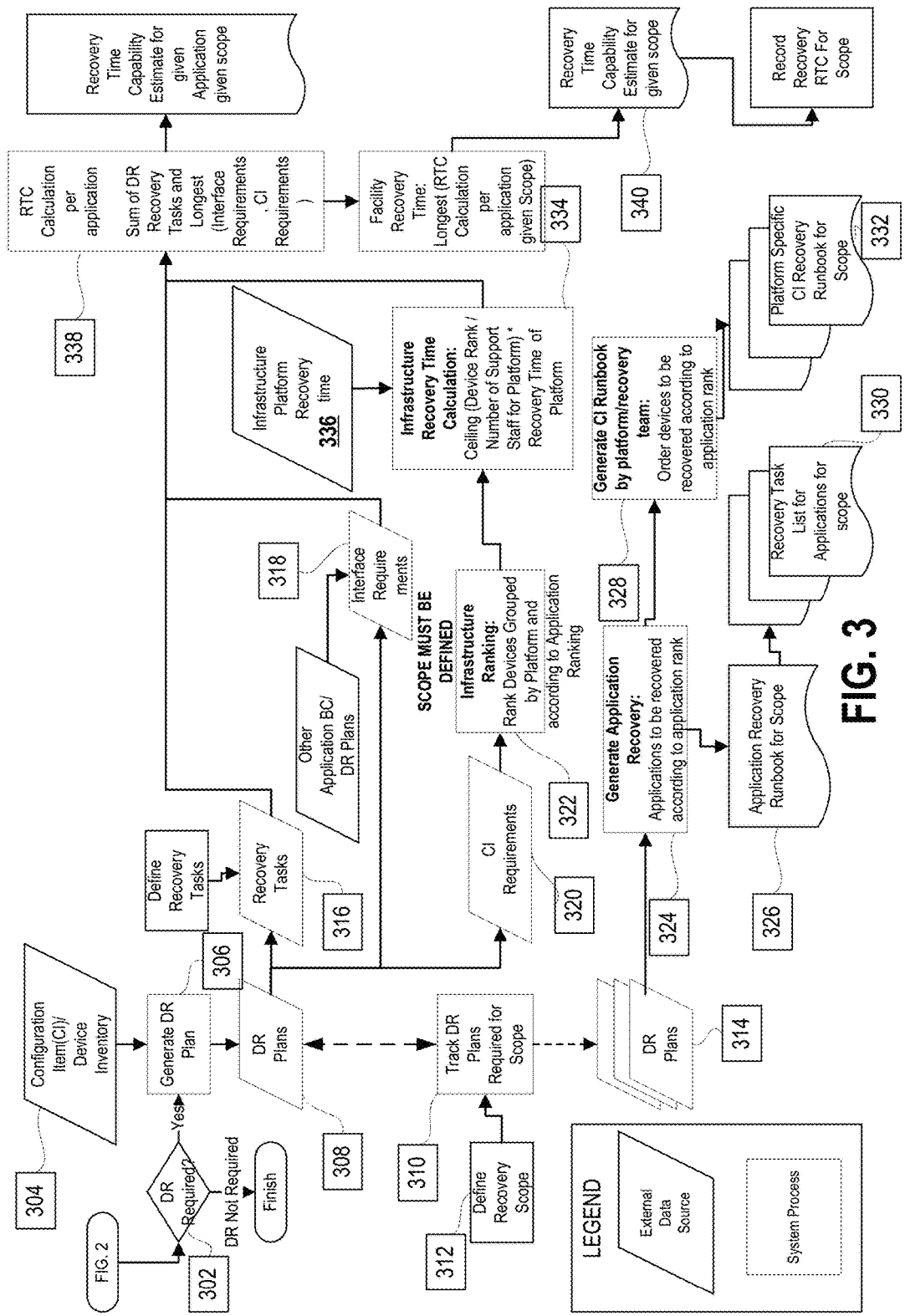
FIG. 3 is a process diagram of an example method for disaster recovery that continues from FIG. 2, according to some embodiments.

FIG. 3 is a process diagram of an example method for disaster recovery that continues from FIG. 2, according to some embodiments. A first step 302 may be to identify whether disaster recovery is required for the applications or not, where disaster recovery is not required, there may be no need to generate a disaster recovery plan. For example, if the applications are all internal training related, there may be no need to generate a disaster recovery plan.

If disaster recovery is required (e.g., there may be critical applications in the application inventory 202), a disaster recovery plan is generated under 306. An inventory of infrastructure/other computing device is provided at 304 (e.g., device records), and disaster recovery operations and plans may be stored on a disaster recovery/boot sequence data structure at 308, which may be tracked across a period of time under 310 in relation to a specific recovery scope (e.g., which applications need to be recovered under what time constraints). FIG. 5 is an example table indicating a ranked set of devices and their associated rankings, according to some embodiments. In FIG. 5, a series of different devices and their platforms is shown, indicating a recovery ranking and an estimated recovery time capability.

In some embodiments, a naïve set of disaster recovery tasks are tracked and defined under 316, and these recovery tasks are ranked based on a naïve order to be prioritized by the system as interface requirements 318, configuration item requirements, 320, and infrastructure requirements are assessed based on their support of underlying applications.

The application inventory 202 is utilized to generate infrastructure rankings 322, whereby devices are grouped by platform and according to application ranking, the rankings being utilized to determine an expected recovery time for each application 338 (e.g., in a functionally operable state) and/or recovery time for the whole system (e.g., in a functionally operable state or a fully operational state). The infrastructure platform recovery time 336 is stored on a data record, and compared against the recovery time objectives stored on the application inventory 202.

A scope of recovery may define acceptable functionally operable states, and an overall recovery time capability estimate 340 may be stored for a particular scope, which may be stored on a data record (e.g., to satisfy future technical audit requirements). FIGS. 6 and 7 are example tables illustrating a ranked set of recovery tasks and their associated task orders for two example applications, according to some embodiments. A series of prioritized and ranked tasks are provided indicating specific steps used for disaster recovery, including the initiation of various services, updating of records, starting of database services, among others.

Disaster recovery plans are generated under 314, and these may include sequential computing operations and associated control signals that represent specific recovery tasks in accordance with an order generated based on the infrastructure ranking and the application ranking. Ordered control signals are provided to establish application recovery under 324, whereby applications are to be recovered according to application rank (note however, some applications may be recovered out of rank as they may be recovered alongside higher priority applications, especially where they share hosted infrastructure or dependencies), and an overall application recovery "runbook" 326 may be generated that is configured to matching the scope of recovery (e.g., to meet required recovery objectives). An infrastructure-specific runbook may be generated that indicates the order of infrastructure devices to be recovered in accordance with the overall application recovery "runbook" 326, and specific instruction sets 332 may be generated for each individual platform in operation by the organization.

Figure 8:
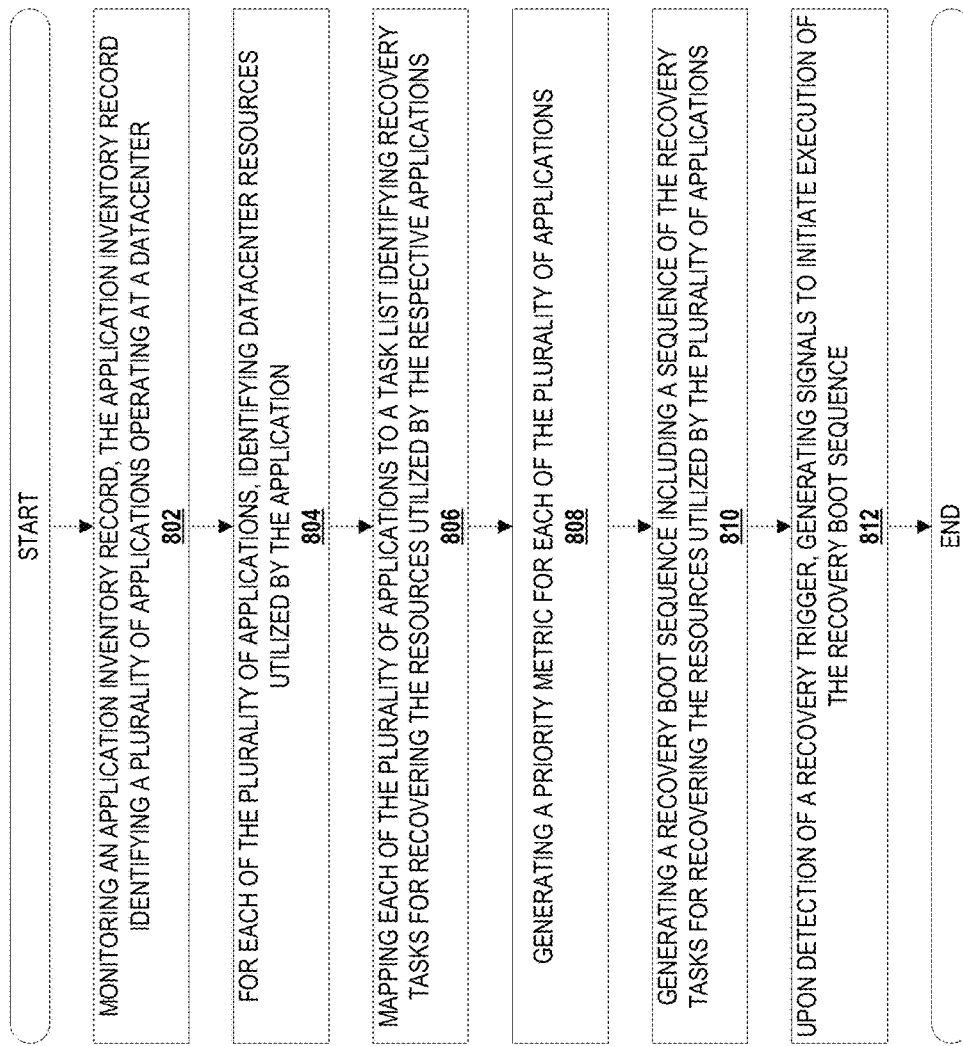
FIG. 8 is a process diagram of an example method for disaster recovery, according to some embodiments.

FIG. 8 is a process diagram of an example method for disaster recovery, according to some embodiments. Example steps are shown, and there may be more, less, different, or alternate steps possible. In some embodiments, aspects of the example methods can be implemented as described above.

At 802, an application inventory record is monitored, the application inventory record identifying a plurality of applications operating at a data center. In some embodiments, the application inventory record is a data structure stored in one or more memories and/or data storage devices. This application inventory record can be updated continuously and/or periodically as applications are added or removed from operation in the system. In some embodiments, one or more processors are configured to monitor for changes to the application inventory record continuously and/or periodically.

At 804, for each of the plurality of applications, the processors identify data center resources being utilized by the application. In some embodiments, identifying the resources being utilized by an application includes monitoring a data center resource inventory record. In some embodiments, the data center resource inventory record identifies which resources are being utilized by the application. In some embodiments, identifying the resources being utilized by an application includes identifying a physical resource (e.g. a server) being utilized an the application (e.g. with the inventory record or otherwise) and additionally identifying any services, operating systems, virtual machines, etc. which are associated with the physical resource as additional resources utilized by the application.

At 806, each of the plurality of applications is mapped to a task list identifying recovery tasks for recovering the resources utilized by the respective applications. Mappings may include generating, in a data structure (e.g., application inventory data structure) a linkage to specific recovery tasks that are required to recover an application. Each recovery task is stored in the form of a data record including a timing parameter indicating how much time is required to conduct the recovery task, and the type of recovery task. Recovery tasks, for example, include updating change records, spinning up/spinning down resources, powering devices on/off, cycling power, installing diagnostics software, starting services, re-imaging devices, among others. The mappings may be conducted by way of pointers, or foreign keys that provide mappings between various data structures (e.g., an application inventory data structure, and an infrastructure inventory data structure). When two applications utilize the same resource, the mappings indicate that tasks for recovering said same resource have the higher of the priority metrics of the two applications.

In some embodiments, the recovery tasks are automated or semi-automated functions that upon receipt of a command signal, are automatically initiated (e.g., silent install, Wake-on-Lan). For example, devices may be configured to operate and be controlled through responses to messages received on a common middleware message bus (that establishes a secure network/communication paths between various computing components). such as IBM WebSphere MQ™. The recovery tasks may be automatically orchestrated and initiated through command signals sent to various infrastructure computing devices, and responses may be received in response to state changes or other indicia of progress in relation to the recovery tasks (e.g., an ACK signal indicating that AIX has been successfully set up on a server).

The mappings (e.g., pointers, linkages, identifiers, foreign keys) are utilized for querying a corpus of infrastructure resource requirements for successfully recovering the application, and in some embodiments, the mappings include additional weightings or metadata indicating whether the mappings are part of a "critical path" (e.g., the recovery task must occur) or whether the mappings are part of a "non-critical path" (e.g., the application is able to function without the recovery task, albeit in an non-ideal operational state). The system may be configured to dynamically identify mappings as critical path or non-critical path. For example, where the hosting of a website is the application and a pool of 10 production servers typically service the website, the website may be operational as long as at least one of the pool of 10 production servers is operational. Accordingly, the system may be configured to dynamically assign recovery of the servers such that the overall recovery is able to achieve desired recovery time objectives for other applications as well (e.g., Server F should be selected as bringing it online also allows a critical co-hosted application to be recovered as well).

In some embodiments, a subset of the recovery tasks in the task list for recovering the resources utilized by a particular application of the plurality of applications is identified as a minimal task list. The recovery boot sequence is generated such that the minimal task list has a higher priority metric in the sequence than other recovery tasks for the particular application. The minimal task list, for example, may represent tasks required to obtain a minimum acceptable operational level of functionality for critical systems, and may represent an improved method for obtaining acceptable recovery time capability, albeit at a lower or impacted level of performance (e.g., the applications may be slow, but still usable).

At 808, a priority metric is generated for each of the plurality of applications. The priority metric may be generated from multiple indicia in concert, including, for example, an asset type, a recovery time objective, a recovery time capability, whether the application is required for regulatory compliance, whether the application is a vendor hosted application, a number of interfacing applications (interfaces weighted based on criticality), among others. Each of these indicia may be identified or processed from an application inventory record, and may be aggregated (e.g., summed) to generate an overall priority metric. The overall priority metric is utilized to determine rankings for the applications, indicating an order of importance and priority in relation to disaster recovery.

The priority metric is provided and processed to generate disaster recovery plans where higher ranked applications are attempted to be recovered first, while lower ranked applications are attempted to be recovered later (or not at all). The priority metric is reflective of interdependencies, and the priority metric is weighted to bias antecedent applications for critical applications such that antecedent applications are ranked higher than its decedent applications. For example, if online banking application requires that a website application is recovered first, the online banking application should be ranked after the website application. The priority metric is stored on a data structure and maintained continuously or periodically.

At 810, a recovery boot sequence is generated including a sequence of the recovery tasks for recovering the resources utilized by the plurality of applications, the sequence determined based on the priority metric such that a first application of the plurality of applications is recovered before a second application of the plurality of applications when the first application has a higher priority that than the second application. The recovery boot sequence may include a series of ranked tasks that are communicated to instruct one or more devices or individuals in relation to tasks that need to be undertaken.

In some embodiments, remote orchestration is utilized whereby control signals/messages are submitted to device controllers which, for example, may execute code or activate circuitry that causes various recovery tasks to be undertaken. For example, scripts may be run that send networking communication messages to turn on devices at a "cold" backup site, among others. In some embodiments, the boot sequence is a series of computer implemented steps that are undertaken by the computing infrastructure resources. The control signals, for example, may include a packet indicating physical MAC addresses, along with a payload of indicated control activities. In some embodiments, the control signals include the transfer of files, instruction sets, and/or system imaging/virtual machine execution.

Recovery boot sequences may be periodically generated to reflect changes in the system, or desired recovery parameters. During regeneration of recovery boot sequences, new applications and/or computing infrastructure may be incorporated, and no longer existing applications/computing infrastructure may be removed. The regeneration of recovery boot sequences may be responsive to detected changes in recovery time objectives, or other parameters. Application rankings, associated infrastructure resources, and recovery tasks may be re-determined and updated accordingly. Where there are a multitude of possible recovery boot sequences that are satisfy desired recovery objectives, in some embodiments, the system is configured to bias additional capacity towards ensuring a higher state of operational functionality for the highest ranked applications (e.g., higher than a lowest acceptable operational state). For example, if there are multiple combinations that yield acceptable recovery for critical applications, the most critical application may be biased to recover the fastest (an improved time beyond the required recovery time), or at the highest level of operational functionality possible (e.g., $5/10$ production servers operational, whereas only 1 production server is required for basic functionality).

At 812, upon detection of a recovery trigger, signals are generated to initiate execution of the recovery boot sequence. Recovery triggers include automatic disaster recovery provisions that are initiated upon the confirmation of an event that has taken place, test simulation events for testing disaster recovery readiness, among others. Execution of the recovery boot sequence includes the undertaking of the recovery tasks, in accordance with a recovery task order ranking as orchestrated by the system 100. The timing of invocation of individual tasks may be orchestrated to ensure that interdependencies are met.

In some embodiments, the processor(s) are configured to automatically repeat one or more of the following aspects of the method upon detection of a change of the application inventory record.

Figure 9:
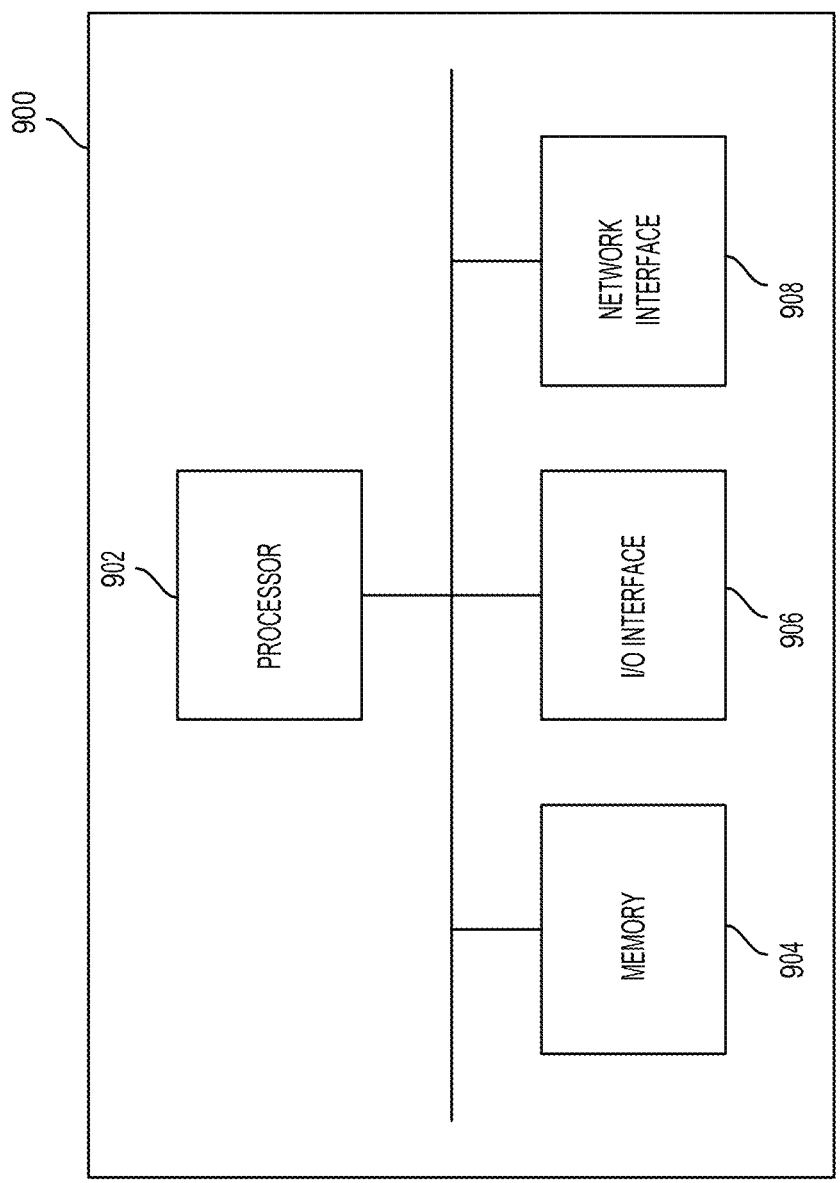
FIG. 9 is a process diagram of an example method for disaster recovery, according to some embodiments.

FIG. 9 is a block schematic of an example computing device for disaster recovery, according to some embodiments. In some embodiments, one or more computing devices are configured to perform one or more aspects of the methods described or otherwise provided for herein. FIG. 9 is a schematic diagram of computing device 900. As depicted, computing device includes at least one processor 902, memory 904, at least one I/O interface 906, and at least one network interface 908.

Processor 902 may be an Intel or AMD x86 or x64, PowerPC, ARM processor, among others. Memory 904 may include a combination of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 906 enables computing device 900 to interconnect with one or more input devices, such as a keyboard, mouse, camera, touch screen and a microphone, or with one or more output devices such as a display screen and a speaker, for example, for generating one or more alerts or notifications.

Each network interface 908 enables computing device 900 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 . signaling network, fixed line, local area network, wide area network, and others, including any combination of these. Computing device 900 may be operable to register and authenticate users (using a login, unique identifier, and password for example) prior to providing access to applications, a local network, network resources, other networks and network security devices. Computing devices 900 may serve one user or multiple users.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems, and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A computer implemented system for generating a data center recovery boot sequence, the system comprising:
    an application prioritization processor configured to monitor an application inventory record, the application inventory record identifying a plurality of applications operating at a data center, and for each of the plurality of applications, the application prioritization processor is configured to identify data center resources utilized by the application and to generate a priority metric for each of the plurality of applications;
    a recovery task provisioning engine configured to map each of the plurality of applications to a task list identifying recovery tasks for recovering the resources utilized by the respective applications, the task list identifying recovery duration records for each of the recovery tasks;
    a boot sequence generation processor configured to generate a recovery boot sequence including a sequence of the recovery tasks for recovering the resources utilized by the plurality of applications, the recovery boot sequence determined based on the priority metric such that a first application of the plurality of applications is recovered before a second application of the plurality of applications when the first application has a higher priority that than the second application; and
    an infrastructure device monitoring engine configured to track execution of a particular recovery task to determine a recovery duration for the particular recovery task, and update the recovery duration record for the particular recovery task;
    wherein the boot sequence generation processor is configured to regenerate the recovery boot sequence based on the updated recovery duration.

2. The computer implemented system of claim 1, wherein upon detection by the application prioritization processor of a new application not previously identified by the application inventory record, the application prioritization processor is further configured to identify data center resources utilized by the first application, map the new application to a task list identifying recovery tasks for recovering the resources utilized by the new application; generate a priority metric for the new application; and generate a new recovery boot sequence including the recovery tasks for the new application.

3. The computer implemented system of claim 2, wherein a subset of the recovery tasks in the task list for recovering the resources utilized by a particular application of the plurality of applications is identified as a minimal task list, and the boot sequence generation processor generates the recovery boot sequence such that the minimal task list has a higher priority metric in the sequence than other recovery tasks for the particular application.

4. The computer implemented system of claim 1, comprising an infrastructure device monitoring engine configured to monitor a data center resource inventory record, the data center resource inventory record identifying a plurality of resources at the data center and one or more of the plurality of applications utilized by the plurality of resources; and
    upon detection of a new resource identified by the data center resource inventory record, the recovery task provisioning engine is configured to map the plurality of applications to new task lists including recovery tasks for the new resource; and
    wherein the boot sequence generation processor is configured to generate a new recovery boot sequence including the recovery tasks for the new resource.

5. The computer implemented system of claim 1, comprising an infrastructure device monitoring engine configured to receive resource utilization data for a resource at the data center, to identify one or more applications utilizing the resource; and to associate the resource and the applications utilizing the resources in a data center resource inventory record.

6. A method for generating a data center recovery boot sequence, the method comprising:
    monitoring an application inventory record, the application inventory record identifying a plurality of applications operating at a data center;
    for each of the plurality of applications, identifying data center resources utilized by the application;
    mapping each of the plurality of applications to a task list identifying recovery tasks for recovering the resources utilized by the respective applications, the task list identifying recovery duration records for each of the recovery tasks;

generating a priority metric for each of the plurality of applications;

generating a recovery boot sequence including a sequence of the recovery tasks for recovering the resources utilized by the plurality of applications, the sequence determined based on the priority metric such that a first application of the plurality of applications is recovered before a second application of the plurality of applications when the first application has a higher priority that than the second application; and tracking execution of a particular recovery task to determine a recovery duration for the particular recovery task;

updating the recovery duration record for the particular recovery task; and regenerating the recovery boot sequence based on the updated recovery duration.

7. The method of claim 6, comprising: upon detection of a recovery trigger, generating signals to initiate execution of the recovery boot sequence.

8. The method of claim 6, comprising: for each of the plurality of applications, determining a recovery time for the application based on an estimated completion time of the recovery tasks of the application in the recovery boot sequence.

9. The method of claim 6, comprising:

upon detection of a new application not previously identified by the application inventory record, identifying data center resources utilized by the first application;

mapping the new application to a task list identifying recovery tasks for recovering the resources utilized by the new application;

generating a priority metric for the new application; and generating a new recovery boot sequence including the recovery tasks for the new application.

10. The method of claim 9, comprising: for each of the plurality of applications, determining a recovery time for the application based on the estimated completion time of the recovery tasks of the application in the new recovery boot sequence.

11. The method of claim 10, comprising: when the estimated recovery time for a particular application of the plurality of applications exceeds a defined recovery threshold for the particular application, generating an alert.

12. The method of claim 6, comprising:

monitoring a data center resource inventory record, the data center resource inventory record identifying a plurality of resources at the data center and one or more of the plurality of applications utilized by the plurality of resources.

13. The method of claim 12, comprising:

upon detection of a new resource identified by the data center resource inventory record, mapping the plurality of applications to new task lists including recovery tasks for the new resource; and generating a new recovery boot sequence including the recovery tasks for the new resource.

14. The method of claim 6, comprising:

receiving resource utilization data for a resource at the data center, and identifying one or more applications utilizing the resource; and associating the resource and the applications utilizing the resources in a data center resource inventory record.

15. The method of claim 6, wherein each application or each task associated with the application is represented by one or more resource identifiers, wherein each resource identifier identifies a specific resource or class of resources on which the application or task is to be executed.

16. The method of claim 6, comprising: when two applications utilize the same resource, assigning a task for recovering said same resource the higher of the priority metrics of the two applications.

17. The method of claim 6, wherein the priority metric is generated based on an application type, an application criticality parameter, an application output criticality parameter or a number of application interfaces.

18. The method of claim 6, comprising: when a subset of the recovery tasks in the task list for recovering the resources utilized by a particular application of the plurality of applications is identified as a minimal task list, generating the recovery boot sequence such that the minimal task list has a higher priority metric in the sequence than other recovery tasks for the particular application.

19. The method of claim 18, wherein for at least one application of the plurality of applications, the application inventory record includes a first entry for a minimum functionality application and a second entry for an additional functionality application, each having separate priority weighting parameters and separate task lists.

20. A computer readable medium storing a set of machine-readable instructions, which when executed, cause a processor to perform steps of a method for generating a data center recovery boot sequence, the method comprising:

monitoring an application inventory record, the application inventory record identifying a plurality of applications operating at a data center;

for each of the plurality of applications, identifying data center resources utilized by the application;

mapping each of the plurality of applications to a task list identifying recovery tasks for recovering the resources utilized by the respective applications, the task list identifying recovery duration records for each of the recovery tasks;

generating a priority metric for each of the plurality of applications;

generating a recovery boot sequence including a sequence of the recovery tasks for recovering the resources utilized by the plurality of applications, the sequence determined based on the priority metric such that a first application of the plurality of applications is recovered before a second application of the plurality of applications when the first application has a higher priority that than the second application;

tracking execution of a particular recovery task to determine a recovery duration for the particular recovery task;

updating the recovery duration record for the particular recovery task; and regenerating the recovery boot sequence based on the updated recovery duration.

* * * * *